US005572655A

United States Patent [19]

Tuljapurkar et al.

[11] Patent Number: 5,572,655

[45] Date of Patent: Nov. 5, 1996

[54] HIGH-PERFORMANCE INTEGRATED BIT-MAPPED GRAPHICS CONTROLLER

[75] Inventors: Shubha Tuljapurkar, Mountain View; George Brecht, Milpitas, both of Calif.

[73] Assignee: LSI Logic Corporation, Milpitas, Calif.

[21] Appl. No.: 380,138

[22] Filed: Jan. 27, 1995

Related U.S. Application Data

[63] Continuation of Ser. No. 3,706, Jan. 12, 1993, abandoned.

[51] Int. Cl.[6] .................... G06F 15/00

[52] U.S. Cl. .................... 395/788; 345/186; 345/189

[58] Field of Search .................... 395/162, 166, 395/164, 131, 157, 500; 345/133, 150, 155, 189, 190, 186

[56] References Cited

U.S. PATENT DOCUMENTS

| | | | |
|---|---|---|---|
| 4,805,007 | 2/1989 | Schroeder | 257/697 |
| 5,001,548 | 3/1991 | Iversen | 257/714 |
| 5,016,138 | 5/1991 | Woodman | 257/686 |
| 5,146,592 | 9/1992 | Pfeiffer et al. | 395/157 |
| 5,151,997 | 9/1992 | Bailey et al. | 395/800 |
| 5,175,853 | 12/1992 | Kardach et al. | 395/650 |
| 5,194,948 | 3/1993 | L'Esperance, III et al. | 348/87 |
| 5,208,745 | 5/1993 | Quentin et al. | 364/188 |
| 5,227,863 | 7/1993 | Bilbrey | 348/578 |
| 5,260,697 | 11/1993 | Barrett et al. | 345/173 |
| 5,265,218 | 11/1993 | Testa et al. | 395/280 |
| 5,287,100 | 2/1994 | Guttag et al. | 345/213 |
| 5,392,391 | 2/1995 | Caulk, Jr. et al. | 395/162 |

OTHER PUBLICATIONS

Williams, Tom, "80860 May Force Rethinking of Graphics System Architectures", Computer Design, V28, N9, p43(3) May 1, 1989.

Case, Brian, "Embedded Processors Focus on Integration:application–Oriented a Fertile area for 1992." Microprocessor Report, V6, N1, p11 (4) Jan. 22, 1992.

Case, Brian, "LSI Creates Single–Chip X Terminal Controller; LR33000 Variant Combines MIPS Core with Graphics Controller", Microprocessor Report, V5, N20, P8(3), Oct. 30, 1991.

Gwennap, Linley, "New Graphics Chips Speeds Up Windows; New products Offer Local Bus, Accelerated Graphics Functions", Microprocessor Report, V6, N12 p9(5) Sep. 16, 1992.

*Primary Examiner*—Mark R. Powell
*Assistant Examiner*—U. Chauhan
*Attorney, Agent, or Firm*—Katz & Cotton, LLP

[57] ABSTRACT

A low-cost high-performance technique for providing bit-mapped graphics display controllers is described whereby video frame buffer memory and video controller functions are integrated together on a single chip, permitting very wide video memory formats without the usual penalties of high pin count, package count, and wiring complexity. The wide video memory format relaxes timing requirements on the video frame buffer memory and provides greater accessibility of the video frame buffer memory for pixel data accesses other than display refresh accesses.

11 Claims, 4 Drawing Sheets

HIGH-PERFORMANCE INTEGRATED BIT-MAPPED GRAPHICS CONTROLLER

This application is a continuation of application Ser. No. 08/003,706, filed Jan. 12, 1993, now abandoned.

TECHNICAL FIELD OF THE INVENTION

The invention relates to computer display systems, more particularly to bit-mapped graphic display systems, and still more particularly to digital display controllers for bit-mapped graphic display systems.

BACKGROUND OF THE INVENTION

Computer display systems, especially those with bit-mapped graphic capabilities, have gained widespread popularity in recent years due to the proliferation of personal computers, high levels of functional integration in graphic display systems, and increasing capability and decreasing cost of computer graphics interfaces and color video monitors.

Bit-mapped computer graphics display systems are characterized by a video frame buffer memory which contains a digital representation of an image to be displayed. The memory is organized such that each group of "n" bits represents a single dot or "pixel" on a display screen. The "n" bits associated with each pixel determine its intensity, color, or other attribute. This direct mapping of bits to individual display pixels is the source of the name "bit-mapped". In normal operation, an image stored in a video frame buffer memory is displayed by rapidly accessing the pixel data in the memory in a raster-scan (e.g., left-to-right, top-to-bottom) order, and presenting this data to a video monitor repeatedly in a serial video stream. While some monitors accept a multi-bit digital video stream, others require that the digital data be converted to an analog form for display. This is usually accomplished in a DAC (Digital to Analog Converter) whereby multi-bit digital pixel data is converted to one or more analog intensity (brightness) signals. For color displays, three analog intensity signals are typically used, one for each of the three primary colors of light: red, blue and green. One or more synchronizing signals are used to synchronize the video monitor to the start of the memory access cycle so that each pixel is displayed in a fixed or pre-determined position on the monitor screen.

Exemplary of bit-mapped graphics systems currently in use are "VGA" controllers, widely used in personal computer graphics applications. A typical modern VGA (Video Graphics Array) color graphics system for an ISA personal computer (Industry Standard Architecture, sometimes referred to as "IBM compatible") has up to 1 Mbyte (1,048,576 bytes) of video frame buffer memory and is capable of displaying up to 256-color graphics images at a displayed resolution of up to 1024×768 pixels (picture elements or dots).

FIG. 1 is a block diagram of a typical VGA interface 100 (a bit-mapped graphics display controller) for a personal computer. An integrated video controller 105 interfaces between a host computer (not shown) via address lines 120, data lines 125, and control lines 115. These address, data, and control lines, 120, 125, and 115, respectively, permit the host computer to read and write registers located within the video controller 105. The data bus (i.e, the collection of data lines) is shown as 16 bits wide, indicating a connection to a host computer with a bus width of at least 16 bits (typical of ISA computers). A clock synthesizer 110, provides master timing for the video controller 105. The integrated video controller 105 is implemented as a single chip.

A notational convention for indicating bus width (the number of signals carried between two functional blocks in a block diagram) is used herein whereby a number immediately to the left of a diagonal slash "/" through a line indicates the number of signals or wires (bus width) associated with the line. This convention is reflected in the Figures.

The video controller 105 generates video timing signals and provides access to an external (to the video controller) video frame buffer memory 130. In FIG. 1, the video frame buffer memory 130 comprises eight 256K×4 (262,144×4) dynamic RAM (DRAM) memory chips 130*a*–130*h*, providing a total of 1 Mbyte (1,048,576×8) of total available video frame buffer memory, organized as a 256K×32 bit memory. Each DRAM chip 130*a*–130*h* has a corresponding set of four data I/O lines 132*a*–132*h* connected to the video controller 105, for a total video bus width (width of the video frame buffer memory unit of exchange with the video controller 105) of 32 bits. The video controller 105 governs all access to the video frame buffer memory 130, and generates an 18 bit address on lines 134, provided in common to all of the video memory chips 130*a*–130*h*.

The integrated video controller 105 accesses the video frame buffer memory 130 for two purposes: 1) to store and/or retrieve pixel data to/from the video frame buffer memory 130 as commanded by the host computer; and 2) to display the pixel data stored in the memory on a video monitor. Video monitors require that the displayed image be periodically refreshed, so the video controller 105 must repeatedly scan through the pixel data in the video frame buffer memory 130. Computer access to the frame buffer memory 130 must be interleaved between the display refresh accesses, thus limiting the amount of time the frame buffer memory is available to the computer.

The integrated video controller 105 itself contains three functional blocks: a video controller core 106, a FIFO 107*a*, a memory access control functional block 107*b*, and a video shift register 108. The video controller core 106 contains registers and logic which implement the basic video timing and interface to the host processor. The FIFO (First-In, First-Out buffer) and memory access control functional block manages all accesses to the video frame buffer memory, and performs the memory accesses required for display refresh, interleaving host computer pixel data, buffered in the FIFO, with the display refresh accesses. The memory access controller permits programmed (host computer) access to the video frame buffer memory in between display refresh accesses (if any such access time is available) and during vertical and horizontal retrace intervals (the time periods when the display "beam" is resetting itself to scan another row of pixels or between images).

For display refresh, the video frame buffer memory 130 is accessed 32 bits at a time. The 32 bits of video data is then placed in a video shift register 108 internal to the video controller 105 and shifted out in a serial video stream on lines 142. The serial video stream (i.e., 142) as shown is 8 bits wide, indicating a capability of displaying up to 256 colors or intensity values for each pixel. A RAM-DAC 140 (Random Access Memory-Digital to Analog Converter) converts the digital pixel data on lines 142 to one or more analog video signals 144 for a video monitor (not shown). A synchronizing signal 146 (Sync) is generated by the video controller 105 to synchronize the video monitor to the video frame buffer access cycle.

While the discussion hereinabove with respect to FIG. 1 makes reference to a VGA-type bit-mapped graphics controller (video controller), the discussion applies to bit-mapped graphics controllers in general, and is not intended to limit the field of this specification to VGA-type controllers or to ISA-type computers. The discussion hereinafter is of a more general nature.

On early video systems, the computer could only gain access to the video frame buffer memory during brief periods of time, because the video refresh access dominated access to the video frame buffer memory. This led to very slow screen update speeds. In response to this, some early systems provided rapid access to the video frame buffer memory by shutting down the video display while an image was being refreshed, causing "video flicker" while new pixel data was being written to or read from the video frame buffer memory. Other early systems would simply over-ride the video refresh access while the frame buffer memory was being read or written by the host computer, causing erratic display dots or "video snow" to appear on the video monitor during computer access to the frame buffer memory.

While this did improve display speed, the resulting erratic displays were considered annoying at best, and unacceptable at worst. It is a requirement of virtually all modern video display systems that "transparent" access (access without disruption of display refresh operations) be provided to the video frame buffer memory. This, of course, requires a faster effective video frame buffer access time, implying faster memories or faster memory access techniques.

A significant factor in the cost of memory chips used in video display subsystems is access time. In general, the faster the memory, the higher the chip cost. DRAMs (Dynamic Random Access Memories) are usually the least expensive type of memory available for such applications. While DRAMs require periodic "refreshing" of memory locations, the repeated serial-access nature of the video refresh memory access provides a natural mechanism for refreshing DRAMs transparently.

One technique which is used to provide faster "apparent" video memory speed is to provide a very wide video memory bus. In the video system of FIG. 1, the video memory bus width (132*a–h*) is 32 bits. This means that 32 bits of pixel data are accessed at once. If there are 8 bits of pixel data per pixel, this means that video memory need be accessed only once every four pixels. However, at extremely high non-interlaced display resolutions (e.g. 1024×768) with high refresh rates (e.g., 72 Hz), the pixel rate is approximately 75 MHz (Megahertz), or 13.33 ns (nanoseconds) per pixel. This means that for this high resolution and refresh rate, it is necessary to access video memory once every 53.33 ns. While this is not impossible using current technology, it is certainly very challenging, and leaves virtually no time for the host computer to access the video frame buffer memory. Only vertical and horizontal re-trace intervals (the time while the video monitor beam is invisibly "resetting" itself) is available for host computer access, i.e., a very small percentage of the time.

If the video memory bus width were widened to 64 bits, however, it becomes necessary to access the video frame buffer memory only once every 106.66 ns. At video memory bus width of 128 bits, the required access rate drops to once every 213.33 ns. At these reduced access times, it is possible to interleave host computer memory accesses with display refresh accesses without disrupting the display. Alternatively, it is possible to use slower DRAMs.

In practice, however, such wide bus widths are not practical for a number of reasons. For example, a 128 bit wide video memory bus requires 128 video data pins on the video controller, and enough printed circuit board area to route the 128 associated signal traces from the pins of the video controller to the video memory chips. As a result, the lengths of the signal traces increase, and parasitic capacitances, induced noise and crosstalk between signal traces increase. The increased lengths of the signal traces and increased parasitic capacitances serve to reduce the effective speed of the video memory by increasing the signal propagation delay across the signal traces. Further, very wide memory bus widths require a greater number of relatively smaller memory chips, increasing both circuit board size and component cost dramatically. As a result, very high performance video systems providing high display resolutions, high refresh rates and higher numbers of bits per pixel (e.g., 24), tend to be large and expensive.

Interlaced operation of video monitors (providing an image in two sweeps of the screen by displaying alternating, interleaved rows of pixels) provides one means for reducing the required memory access time, but the resultant perceived display flicker tends to cause eye strain, and is generally regarded as undesirable or unacceptable.

A further limitation on the performance of video systems is related to package-related delays. Every pin of a package has an associated capacitance, requiring a relatively large driver circuit on the integrated circuit to overcome the capacitance and provide acceptable signal speed. These drivers require a disproportionately large portion of die area, and integrated circuits with very large numbers of pins require very large dies just to provide the required driver circuits. Even if a video memory chip could be designed with zero internal access time, there are lower limits on the pin-related delay times. As memories become faster, the pin-related delays present a larger portion of the total memory access time, thereby placing implicit lower limits on memory access time for any given package.

As a result of the performance limitations discussed hereinabove, many modern computer graphics display systems suffer from a video bandwidth "bottleneck" problem, whereby the host computer is capable of computing pixel values faster than the video controller is capable of accepting them and presenting them to the video frame buffer memory. As a result, overall system performance is negatively affected by delays inherent in the design of the video controller and video frame buffer system. These delays are particularly noticeable at high refresh rates and display resolutions, where display refresh-related demands on the video frame buffer memory are greatest. This bottleneck problem is only partially addressed in some systems by providing a FIFO (e.g. 107 with respect to FIG. 1) for buffering pixel data from the host processor. The data is unloaded from the FIFO by a memory access controller when a break occurs in the display refresh sequence. However, when the host processor attempts to manipulate large amounts of data, the FIFO fills up and the processor is forced to wait. Providing a larger FIFO merely delays the time when the FIFO becomes full. The basic problem is that the processor is capable of putting data into the FIFO at a rate faster than the rate the video frame buffer memory is available for unloading the FIFo.

DISCLOSURE OF THE INVENTION

It is therefore an object of the present invention to provide an improved bit-mapped graphics display controller.

It is another object of the present invention to provide a technique for improving the amount of time a host computer may gain access to video frame buffer memory in a bit-mapped graphics display system.

It is a further object of the present invention to reduce the cost of high-performance bit-mapped graphics display systems.

It is a further object of the present invention to provide a technique for reducing the speed required of video frame buffer memory by high-performance bit-mapped graphics display systems.

It is a further object of the present invention to eliminate or minimize the video "bottleneck" problem.

It is a further object of the present invention to reduce the amount of circuit board space required by high-performance bit-mapped graphics display systems.

It is a further object of the present invention to provide a practical technique for implementing very wide video memory buses in high-performance bit-mapped graphics display systems without significantly increasing printed circuit board space or integrated circuit package size (pin count).

It is a further object of the present invention to minimize the amount of delay introduced in a bit-mapped graphic system by wiring delays, parasitic capacitances, and pin buffer delays.

According to the invention, a video controller functional block and video frame buffer memory are integrated together on a single semiconductor die (integrated circuit chip). The video frame buffer memory is organized in a "wide" format, where a "wide" format is one at least "n" bits in width, where "n" is, for example 128,256, 512,768, or 1024. The wide video memory format is made possible by the integration of the video controller and the video frame buffer memory, since all of the connections are internal to the integrated circuit die and do not require pad buffers, pins, or extra packages. By providing a wide video memory format, the display refresh function requires less frequent access to the video frame buffer memory. As a result, the percentage of the time that the video frame buffer memory is "tied up" in display refresh is proportionately reduced, allowing the host processor (computer) more frequent access to pixel data in the video frame buffer memory.

Such a bit-mapped video controller (graphics controller) integrated onto a single semiconductor die comprises a video controller functional block on the semiconductor die, a video frame buffer memory on the semiconductor die organized in a "wide" format, an interface between the video controller functional block and a host computer, means on the semiconductor die for retrieving pixel data from the video frame buffer memory and providing it in a serial video format, and means on the semiconductor die for exchanging pixel data between the video controller and the video frame buffer memory.

According to a feature of the invention, a cache memory may be provided between the video controller functional block and the video frame buffer memory.

According to another feature of the invention, a FIFO buffer may be provided between the video controller functional block and the video frame buffer memory.

In a particular implementation, a single semiconductor die has a video controller functional block on the semiconductor die, a one megabyte video frame buffer memory organized in a 256 bit wide by 32768 bit deep format on the semiconductor die, an interface between the video controller functional block and a host computer, first means on the semiconductor die-for retrieving pixel data from the video frame buffer memory by accessing pixel data in the video frame buffer memory and providing it in a serial video format, means for providing one or more video synchronizing signals, a cache memory on the semiconductor die, logically positioned between the video controller functional block and the video frame buffer memory, and providing a buffer for pixel data accesses therebetween, and means on the semiconductor die for interleaving video frame buffer memory accesses such that pixel data accesses from the video controller via the cache memory are permitted only between pixel data accesses by the first means.

The cost of high-performance bit-mapped graphics display systems is reduced in this manner, by eliminating a large number of packages, and providing cost-effective, practical means for providing a wide video memory bus. With many of the performance constraints eliminated, and with the video "bottleneck" problem eliminated, high-performance bit-mapped systems may be readily built at minimal cost.

Printed circuit board space is minimized by eliminating the packages required for video memory (in prior art implementations), and by simplifying connections and reducing the number of traces required on a printed circuit board.

Other objects, features and advantages of the invention will become apparent in light of the following description thereof.

DETAILED DESCRIPTION OF THE INVENTION

The present invention eliminates many of the significant problems associated with prior-art video controller systems by integrating the video controller and video frame buffer memory on a single integrated circuit chip. By doing this, no packages are required for the video frame buffer memory. All connections between the video frame buffer memory and the video controller are internal to the chip, requiring no pad buffers (pin drivers) and having extremely short length and very small parasitic capacitance. Also, by eliminating the pin and wiring delays between the video controller and the video frame buffer memory, the effective speed of a DRAM memory of a given technology is increased. In a bit-mapped graphics display system incorporating the techniques of the invention, where a large video frame buffer memory is used, as much as 20 ns or more of memory access time may be eliminated by integrating the video controller and video frame buffer memory together on a single semiconductor die.

A major consideration in prior-art bit-mapped video graphics controllers is the organization and size of video frame buffer memory, since very wide video frame buffers tend to require large numbers of chips, large numbers of video controller pins, and a great deal of printed circuit board space. In the present inventive technique, since no package pins are used between the video frame buffer memory and the video controller, video frame buffer bus widths may be made arbitrarily large, for example, greater than 128,256,512 or 1024 bits wide, without concern about the impact of video frame buffer memory organization on the number of packages or on pin count. For the purposes of this specification, a "wide" video bus or video memory is defined as a video bus or video memory having a width greater than or equal to "n" bits of video data, where "n" is, for example, 128, 256, 512, 768, or 1024.

By making the video frame buffer bus width very large, the frequency of video frame buffer memory access required for refreshing a video display is proportionately reduced, providing greater availability of the video frame buffer memory to the host computer. For example, in a bit-mapped display system with a video bus width of 256 bits, at a displayed non-interlaced resolution of 1024 by 768 pixels, with 256 colors (8 bits) per pixel, the video frame buffer need be accessed only once every 426.666 ns, easily permitting several host computer accesses to video frame buffer memory between sequential display refresh accesses.

Unlike traditional integration efforts, where existing discrete components are simply re-implemented in a smaller number of chips, the present inventive technique makes possible wide-bus video memory architectures which would not otherwise be practical.

Figure 1:
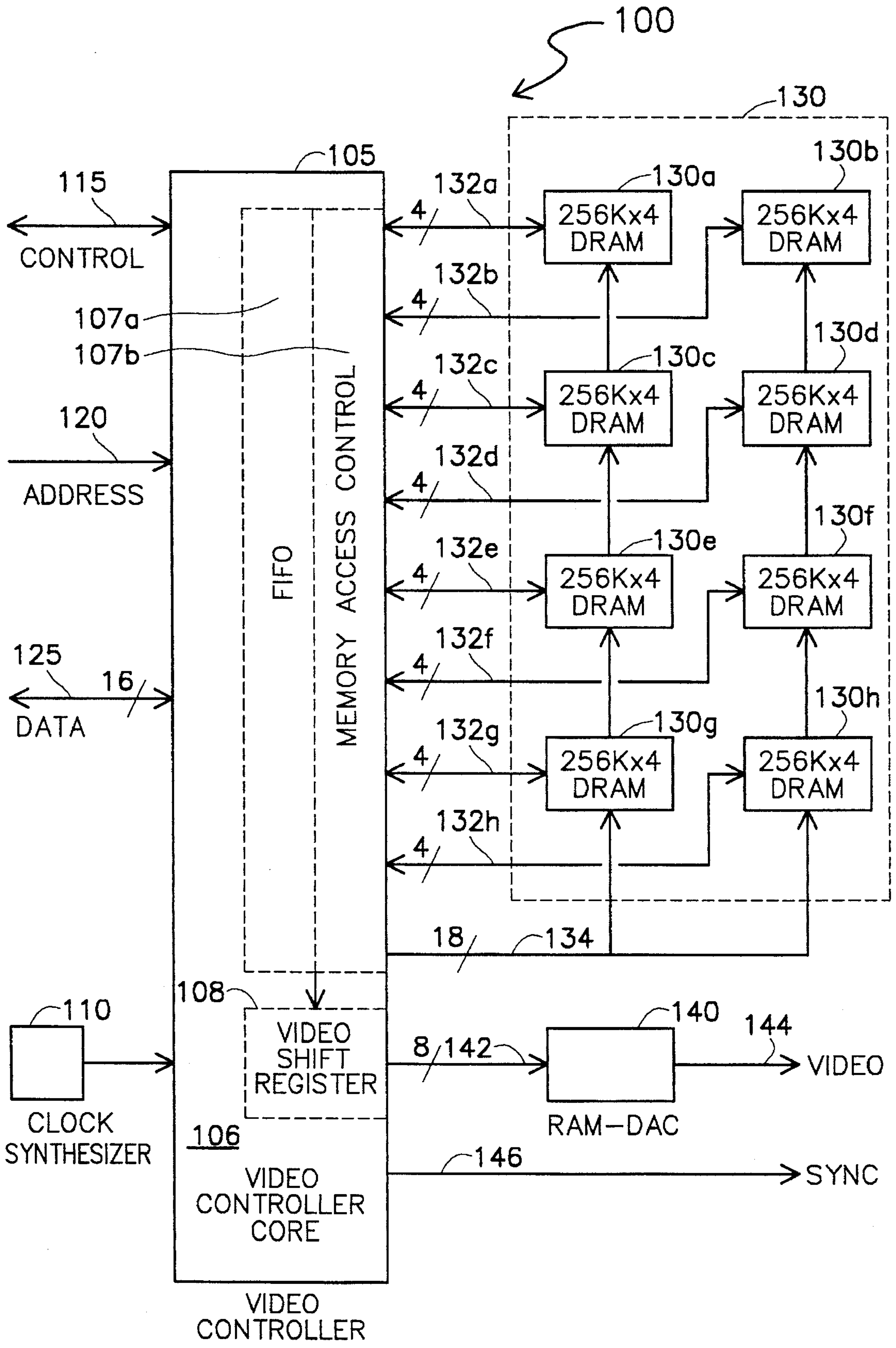
FIG. 1 (PRIOR ART)
FIG. 1 is a block diagram of a bit-mapped graphics display controller with external frame buffer memory, of the prior art.
Figure 2:
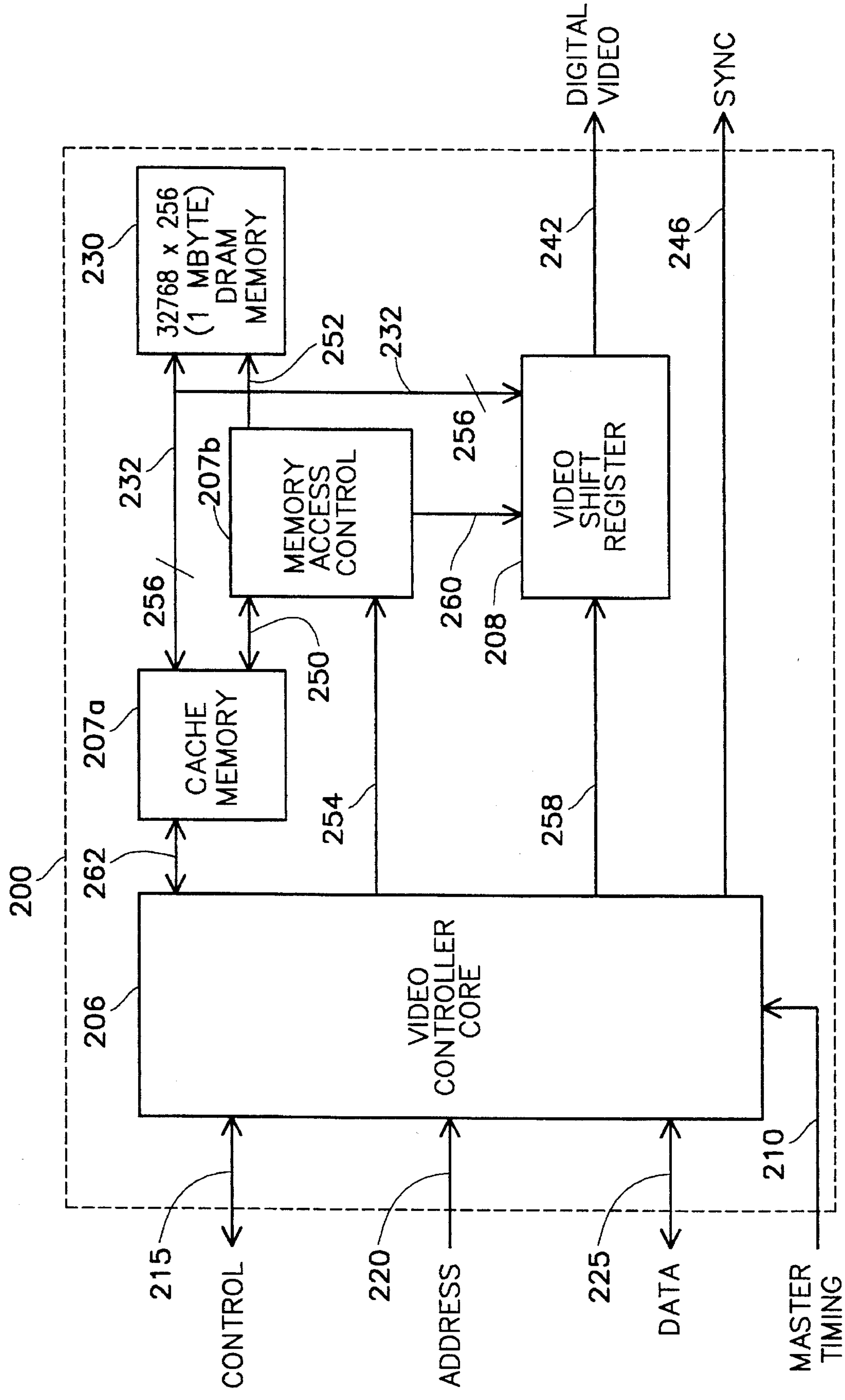
FIG. 2 is a block diagram of an integrated video controller chip for a bit-mapped graphics display system, according to the present invention.

FIG. 2 is a block diagram of a single-chip bit-mapped graphics display controller 200 according to the present invention. A video controller core 206, cache memory 207*a*, memory access control functional block 207*b*, a video shift register 208, and a 1 Megabyte DRAM video frame buffer memory 230 are integrated together on one chip. The boundaries of the chip 200 are indicated by a dashed line. The video controller core 206 provides basic video signal timing and interfaces to a host processor (computer) via control lines 215, address lines 220 and data lines 225. A master timing signal 210 (essentially a master clock signal) provides a frequency reference to the video controller core 206 for the generation of basic video timing and synchronization signals 246. The video controller core 206 accesses pixel data in the video frame buffer memory 230 via the cache memory 207*a*. The video controller core 206 accesses video frame buffer memory 230 (as commanded by the host computer) via the cache memory 207*a* across lines 262. The cache memory 207*a* is optional, but provides improved access to the video frame buffer memory 230 over comparable FIFO memory interfaces (such as that depicted in FIG. 1). The cache memory is based upon a (relatively) small high-speed (e.g., 10–20 ns) static RAM buffer. Any of a variety of suitable cache memory techniques, (e.g., direct-mapped, set-associative, etc.) may be used. Cache memories are widely known in the art, and will not be further elaborated upon herein.

The video controller core 206 is a functional counterpart of the video controller core described hereinabove as 106 with respect to FIG. 1.

The video frame buffer memory 230 is organized as a 32768 bit deep by 256 bit wide memory, i.e., it is accessed 256 bits at a time. The video memory data is presented on a 256 bit wide video frame memory bus 232, which connects the video frame buffer memory 230 to the cache memory 207*a* and the video shift register 208. In a single chip configuration of this type, using conventional 4 megabit or 16 megabit DRAM technology, it is not difficult to obtain effective memory access times of 50 ns or less.

The memory access control functional block 207*b* governs all access to the video frame buffer memory 230. Control signals 252 generated by the memory access control functional block 207*b* cause the video frame buffer memory 230 to be written and read. Video frame buffer memory access requests (from the cache memory 207*a*) and grants (from the memory access controller 207*b*) are exchanged along lines 252. Control signals 260 cause video memory data on video memory bus 232 to be written to the video shift register 208. Mode information is received by the memory access control functional block 207*b* from the video core 206 along lines 254. This mode information indicates the selected display resolution and type and frequency of memory access required for display refresh. Similarly, control information from the video controller core 206 on lines 258 configure the video shift register for the correct pixel depth (number of bits per pixel) according to the selected video display mode.

The video shift register 208 performs a parallel-to-serial conversion of the video memory data at the displayed pixel rate such that new digital pixel data is shifted on to digital video lines 242 for each pixel. The digital video signal is provided to an external display device in a serial video format. The video controller core generates one or more synchronizing signals ("Sync") on line 246.

A key feature of the present inventive technique is the integration of the video controller logic and the video frame buffer memory, permitting very large video bus widths without increasing the number of printed circuit board traces, package count or pin count. This also relaxes memory speed requirements by eliminating signal delays due to parasitic capacitances, wiring, and pin or pad drivers (pad buffer circuits).

Because of the elimination of extra packages and their attendant relatively high-current pin drivers, a fringe benefit of significantly reduced power consumption is realized by the technique of the present invention. This makes bit-mapped graphics display controllers of this type particularly applicable to battery-powered applications, such as laptop and notebook computers.

Assuming that 8 external DRAM chips would be used in an equivalent prior-art bit-mapped graphics display system, power savings for the techniques of the present invention may be estimated as follows:

Based upon 100 pf (picofarads) per address pin (roughly 12.5 pf contributed per DRAM chip) as seen at the video controller chip, with 12 active address pins, operating at 33 MHz, with a 5 Volt power supply, current saving are given approximately by: 100 pf×5 volts×33 MHz, ×12 pins=200 ma (milliamps). At 5 volts, this is a 1 watt savings by the elimination of the address pins alone. The amount of power saved by the elimination of the 32 DRAM data pins is also significant. Dynamic current and static current contributions from these are also saved. A conservative estimate is an additional savings of 400 ma, or another 2 watts of power dissipation.

Alternative approaches to the cache memory (207*b*) shown in FIG. 2 include providing a FIFO buffer, such as that described with respect to FIG. 1, between the video controller core and the video frame buffer memory in place of the cache memory. Such an implementation 200*a* is shown in FIG. 3, which is identical to the video controller chip of FIG. 2 except that the cache memory 207*b* is replaced with a FIFO buffer 207*c*.

Figure 4:
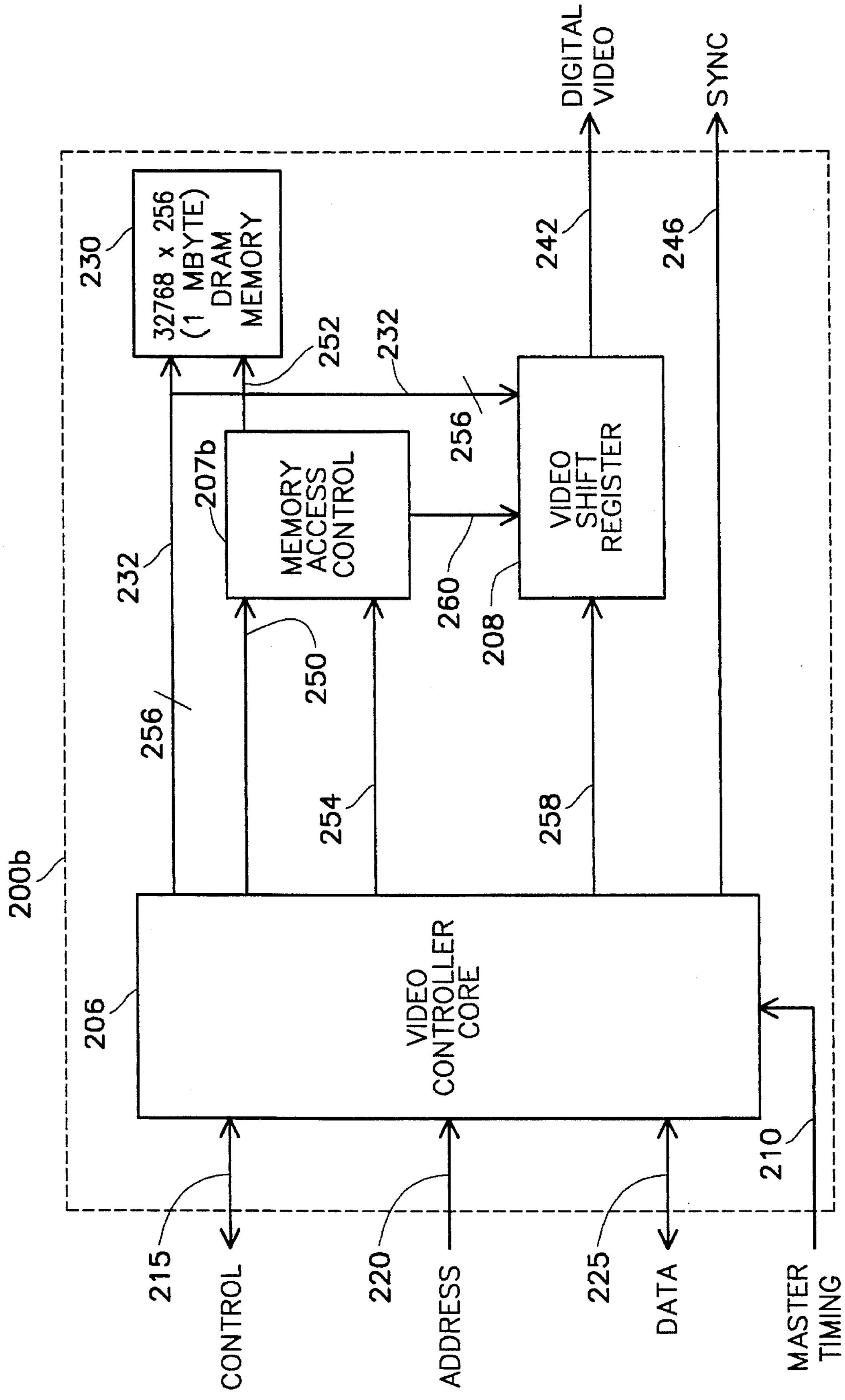

It is also an alternative, in some cases, not to provide any buffer between the video controller 206 and the video frame buffer memory 230. In the event that the frame buffer is busy, the video controller 206 simply waits until the frame buffer becomes available. Such an alternative implementation 200*b* is shown in FIG. 4, which is identical to the video controller chip 200 of FIG. 2*a* except that no buffer or cache of any kind is used between the video controller core 206 and the video frame buffer memory 230. The 256 bit video memory bus 232 connects directly to the video controller core 206, providing direct, unbuffered access from the video controller core 206 to the video frame buffer memory 230. Control of access to the video frame buffer memory 230 by the video controller core 206 is effected by the memory access control functional block 207*b* via line 254.

Figure 3:
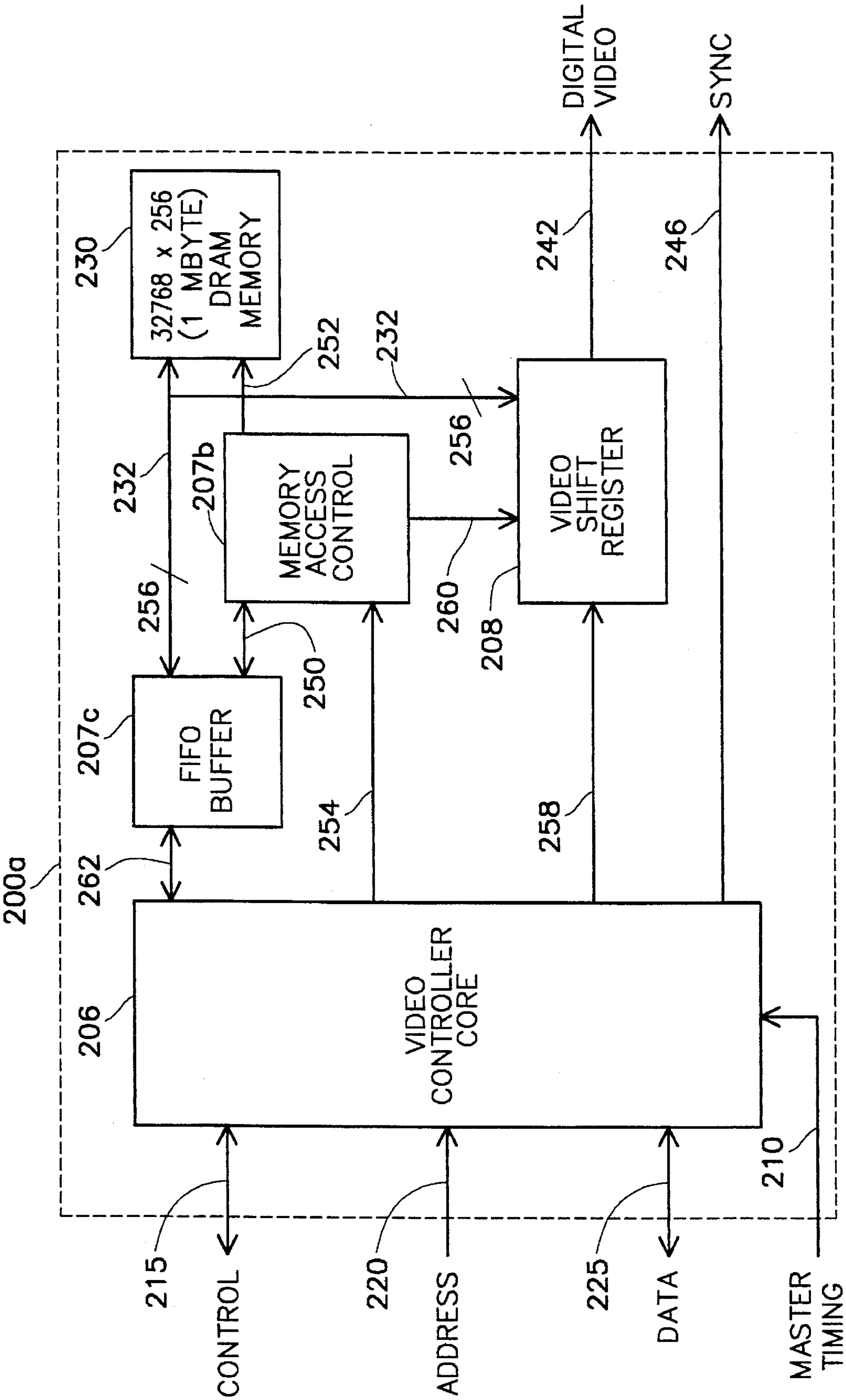
FIGS. 3 and 4 are block diagrams of alternative implementations of the integrated video controller chip of FIG. 2.

The alternative implementations depicted in FIGS. 3 and 4 would be used only in cases where video frame buffer memory is sufficiently available to the host computer that any delays imposed by waiting for a display refresh access to complete are minimal or tolerable.

What is claimed is:

1. A computer bit-mapped video controller on a semiconductor die comprising:

a video controller functional block on the semiconductor die;

a video frame buffer memory on the semiconductor die, said video frame buffer memory being organized in an "n"-bit wide format, wherein "n" is at least 128 bits, said video frame buffer memory being closely coupled to said video controller functional block by an "n" bit wide parallel bus, whereby the refresh rate of the video frame buffer memory is reduced;

an interface on the semiconductor die for interfacing between the video controller functional block and a host computer;

first means on the semiconductor die for retrieving pixel data from the video frame buffer memory in the "n"-bit wide format over the "n" bit wide parallel bus, wherein "n" is at least 128 bits, and providing said pixel data in a serial video format; and second means on the semiconductor die for exchanging pixel data between the video controller functional block and the video frame buffer memory in the "n"-bit wide format over the "n" bit wide parallel bus, wherein "n" is at least 128 bits.

2. The computer bit-mapped video controller according to claim 1, wherein:

the video frame buffer has a width of at least 256 bits.

3. The computer bit-mapped video controller according to claim 1, wherein:

the video frame buffer has a width of at least 512 bits.

4. The computer bit-mapped video controller according to claim 1, wherein:

the video frame buffer has a width of at least 768 bits.

5. The computer bit-mapped video controller according to claim 1, wherein:

the video frame buffer has a width of at least 1024 bits.

6. The computer bit-mapped video controller according to claim 1, wherein:

the second means includes a cache memory.

7. The computer bit-mapped video controller according to claim 1, wherein:

the second means includes a first-in first-out (FIFO) buffer.

8. A computer bit-mapped video controller on a semiconductor die comprising:

a video controller functional block on the semiconductor die;

a one megabyte video frame buffer memory on the semiconductor die, said video frame buffer memory being organized as a 256 bit wide by 32,768 bit deep video memory, said video frame buffer memory being closely coupled to said video controller functional block, whereby the refresh rate of the video frame buffer memory is reduced;

an interface on the semiconductor die for interfacing between the video controller functional block and a host computer;

first means on the semiconductor die for retrieving 256 bit wide pixel data from the video frame buffer memory by accessing said pixel data in said video frame buffer memory and providing said pixel data in a serial video format;

second means for providing one or more video synchronizing signals;

a cache memory on the semiconductor die, logically positioned between the video controller functional block and the video frame buffer memory, and providing a 256 bit wide buffer for pixel data accesses therebetween: and third means on the semiconductor die for interleaving video frame buffer memory accesses such that pixel data accesses from the video controller functional block via the cache memory are permitted only between pixel data accesses by the first means.

9. A bit mapped video controller on a semiconductor die for use with a computer system, said video controller comprising:

a semiconductor die, said semiconductor die containing;

a video memory having at least one megabyte of digital video data storage capacity and arranged in an "n"-bit wide format, wherein "n" is selected from the group of at least 128, 256, 512, 768 and 1024 bits, whereby the refresh rate of the video memory is reduced:

a video shift register closely coupled to said video memory for receiving stored digital video data in "n"-bit wide format over an "n"-bit wide parallel bus, said video shift register adapted to output the received stored digital video data in serial video format;

an interface adapted for connection to the computer system data address and control buses, said interface closely coupled over the "n"-bit wide parallel bus in "n"-bit wide format to said video memory, said interface transferring digital video data received from the computer system to said video memory; and a logic controller for controlling said interface, video memory and video shift register and the digital video data therebetween.

10. The controller of claim 9 further comprising on the semiconductor die a first-in-first-out buffer between said interface and said video memory.

11. The controller of claim 9, further comprising on the semiconductor die a cache memory between said interface and said video memory.

* * * * *